Feb. 9, 1943.  E. W. STECKEL ET AL  2,310,471
RECOVERY OF VOLATILE METALS
Filed Aug. 1, 1940
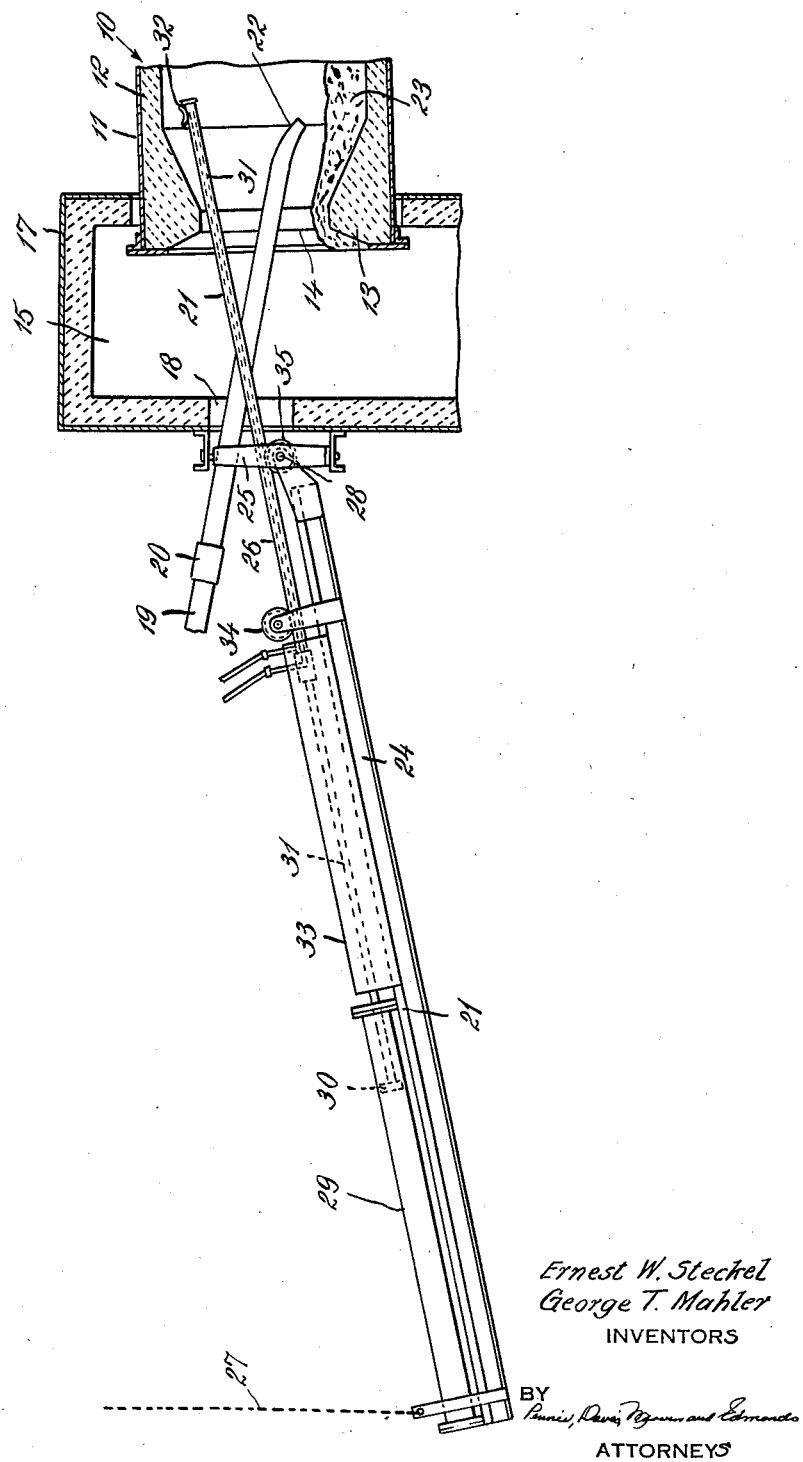
Ernest W. Steckel
George T. Mahler
INVENTORS
BY
ATTORNEYS Patented Feb. 9, 1943

2,310,471

UNITED STATES PATENT OFFICE 2,310,471

RECOVERY OF VOLATILE METALS

Ernest W. Steckel, Slatington, and George T. Mahler, Palmerton, Pa., assignors to The New Jersey Zinc Company, New York, N. Y., a corporation of New Jersey Application August 1, 1940, Serial No. 349,274

13 Claims. (Cl. 23—148)

This invention relates to the recovery of volatile metal and particularly zinc from a solid charge containing a carbonaceous reducing agent involving heating the charge as it passes through a rotary kiln or equivalent apparatus in contact with oxidizing gas that serves to oxidize the metal evolved from the charge and to carry the resulting fume from the kiln. The invention provides improvements in methods and apparatus employed in such recovery operations to the end that kiln capacity is increased and fuel consumption decreased. In its preferred aspect, the invention contemplates improvements in Waelz kiln operations for the recovery, as oxide, of zinc from low grade ores and metallurgical products.

In Waelz kiln operations a solid zinciferous charge containing a carbonaceous reducing agent is passed through an elongated rotary kiln that slopes slightly in the direction of passage of the charge. The charge is heated as it passes through the kiln with the result that zinc compounds present therein are reduced by the carbon and zinc vapor is evolved. This vapor is oxidized by a current of oxidizing gas that passes through the kiln in countercurrent contact with the charge and the resulting zinc oxide fume is removed from an end portion of the kiln while the solid residue from which zinc has been evolved is discharged from the other end of the kiln. The current of oxidizing gas (say, air) is introduced at least in part at the end of the kiln from which the residue is discharged, and the fume issuing from the other end of the kiln is sent to a baghouse, electrostatic precipitator or other dust separator in which the zinc oxide, which usually is contaminated with carbon and fines from the charge, is collected.

The invention, as applied to the above-described operation, contemplates the direction of a blast of auxiliary oxidizing gas, say air, upon the hot residue (from which all but a small portion of the volatile metal has been removed) just prior to discharge of the residue from the kiln, with the result that a zone of intense heat is created at the discharge. The main current of oxidizing gas is introduced into the kiln through this zone and is thereby preheated. The heat of the zone is generated by reaction between the oxygen of the blast and excess carbonaceous reducing agent or fuel remaining in the residue or by reaction between the oxygen of the blast and reduced non-volatile metal (such as iron) present therein, or both. Thus, the heat may be generated partly by oxidation of the excess fuel that is a constituent of the normal Waelz kiln charge and partly by oxidation of sponge iron present in the residue of a Waelz kiln charge compounded with iron-bearing zinc ore, such as franklinite.

The oxidizing gas should be supplied under a pressure adequate to produce a powerful blast, but not a blast of sufficient intensity to blow the charge away from the gas jet. Pressures ranging from 12 inches to 30 inches of water are generally appropriate; optimum conditions of operation are attained when the air blast is supplied at a pressure of 25 to 30 inches of water.

Improved operations result from the placing of a relatively shallow annular dam (say, 12 inches high) immediately at the discharge end of the kiln. The dam retards the flow of residue and maintains a large body thereof at the point of air blast, thus increasing the intensity of heat in the adjacent zone.

As a result of the high temperature prevailing in the neighborhood of the blast, which generally exceeds that of any other portion of the kiln, the charge tends to soften and to adhere to the walls of the kiln adjacent the discharge end thereof, forming annular accretions or "rings." If permitted to grow uninterruptedly these rings constrict the discharge end of the furnace and may require cessation of operations while they are removed. We have found, however, that ring formation may be avoided with but little effort if the kiln wall in the high temperature zone is subjected to barring or chiselling at frequent intervals (and preferably substantially continuously) with a quick-acting power-operated ram or lance that projects into the discharge end of the furnace and cleans successive portions of the kiln wall as they revolve above the main body of residue leaving the lower part of the kiln.

On account of the high temperature resulting from the oxidation (by the blast) of excess carbonaceous material (say, coal) and of non-volatile metal (say, iron) in the residue, not only the blast air, but all the air entering the residue discharge end of the kiln is heated to a relatively high temperature, so that, in effect, the kiln is supplied with preheated air. This intensifies the operation of zinc elimination throughout the kiln and results in a great increase in capacity. Moreover, auxiliary firing of the kiln with dust coal or an oil burner, which ordinarily has been necessary in Waelz kiln operations, can be dispensed with either entirely or in part. When an iron-bearing zinciferous charge is treated in accordance with our invention, no auxiliary firing is needed except perhaps for a short period when the kiln is first put in operation.

The reduction of zinc ore is endothermic, and in the practice of our invention with such an ore, it is desirable to so operate the kiln that only a small proportion of zinc oxide or other reducible zinc compound remains in the charge when it has reached the discharge end of the kiln and becomes subjected to the air blast. Otherwise, the temperature of the zone in the neighborhood of the blast will be lowered substantially, for reduction of zinc oxide with the carbon in the residue consumes heat and drops the temperature below that required for adequate preheating of the entering air current.

For best results, the blast should be concentrated in a restricted area on the surface of the residue. Thus, we prefer to direct the blast downwardly by means of a nozzle or other conduit of relatively small aperture on one or more relatively small areas on the surface of the body of residue passing from the discharge. The residue tends to adhere somewhat to the kiln, so that as the kiln rotates most of the residue will be carried into direct contact with the blast even if its area of application is restricted. In any case, the concentration of the blast, as contrasted with its dispersion over the whole cross section of the residue adjacent the discharge, tends to intensify the heat in the discharge end of the kiln.

As indicated above, recommended practice is to employ a simple blast pipe that projects into the discharge end of the kiln with its open end directed downwardly immediately above the body of residue. This structure is preferred over one which admits air from underneath the charge for reasons of simplicity, ease of removal and repair and because there is substantially no opportunity for the air outlet to become plugged with residue.

As indicated above, the invention is not limited in its application to the recovery of zinc and may be applied to the recovery of other relatively volatile metals, such as tin, lead, cadmium, arsenic, antimony and bismuth, but its greatest advantages probably accrue in zinc recovery, particularly from an iron-bearing charge, such as one compounded with franklinite. The iron in such a charge is reduced by the carbon and, being substantially non-volatile, remains in the residue until it comes in contact with the blast and reacts exothermically to aid in the maintenance of the hot zone.

To summarize, in the recovery of volatile metal from a charge containing a carbonaceous reducing agent (fuel) and involving heating the charge as it passes through a rotary kiln in contact with a current of oxidizing gas, the metal being volatilized from the charge and burned in the gas to form a fume that is withdrawn from an end portion of the kiln while the hot solid residue of the charge is withdrawn from the opposite end portion, our invention contemplates the improvement which comprises directing a blast of auxiliary oxidizing gas on the residue as it is discharged from the kiln to oxidize excess fuel or non-volatile metal, such as iron, therein and create a zone of intense heat, and preheating the current of oxidizing gas entering the kiln by passing it through this zone. Thus, the heat may be produced by action of the blast upon carbonaceous fuel supplemented by the oxidation of a relatively non-volatile metal (such as sponge iron) present in the residue.

The above-described process is best practiced in a Waelz kiln equipped with the combination which comprises a blast pipe projecting into the discharge end of the kiln and opening downwardly just inside the end and near the bottom thereof (so that it directs a blast on a restricted area on the surface of a body of hot oxidizable residue about to be discharged from the kiln) and a mechanical rammer that is reciprocable longitudinally of the kiln and projects into the discharge end of the kiln near the upper wall thereof. Means should be provided, of course, for forcing oxidizing gas under pressure from the blast pipe on the residue, and the rammer preferably slopes upwardly toward the upper wall of the kiln. Moreover, the combination preferably also includes a relatively shallow annular dam disposed just inside the periphery of the discharge end of the kiln to maintain a relatively large body of residue upon which to direct the blast.

These and other features of our invention will be more thoroughly understood in the light of the following detailed description, taken in conjunction with the accompanying single figure which is a fragmentary sectional elevation taken longitudinally through the discharge end of a Waelz kiln equipped for the practice of our invention.

Referring to the drawing, it will be observed that the apparatus comprises a rotary kiln 10 formed of a metal shell 11 with a refractory lining 12. (Kilns of this general type are employed in the production of hydraulic cements and in many other processes.) The kiln is provided with conventional means (not shown) such as a peripheral ring gear for rotating it and has an annular dam 13 adjacent its open discharge end 14. This dam slopes gradually to the inside of the kiln.

The discharge end of the kiln projects into a chamber 15 walled with refractory 17. The chamber has an opening 18 opposite the discharge end of the kiln through which project a downwardly sloping blast pipe 19 (supplied with low pressure air from a blower, not shown, through a flexible connection 20) and an upwardly sloping mechanical rammer or lance 21.

The blast pipe projects through the chamber into the discharge end of the kiln to a point just beyond the dam and has a nozzle 22 that directs a blast of air downwardly upon the residual charge 23 that is passing from the kiln.

The frame 24 of the rammer is supported on the chamber wall adjacent the opening by a vertically disposed swivel 25 which permits horizontal radial movement of the other end 26 of the rammer. This other end 26 of the rammer is suspended by means of a chain block hoist 27, mounted on a curved trolley beam (not shown) to permit the horizontal radial movement of the end of the rammer. The slope of the rammer may be changed by raising or lowering its outer end, since its inner end is attached to the swivel by a hinge 28 that permits vertical movement.

An air cylinder 29 is mounted on the outer end of the rammer, and is equipped with a long piston 30 that carries a lance or ram-rod 31. The latter projects through the chamber into the kiln and is adapted to scrape or knock off material which adheres to the kiln wall or dam and is carried to an upper position as the kiln rotates. The ram rod is water-cooled and carries a horizontally disposed scraper plate 32 on its furnace end. Longitudinally grooved guide plates 33 and grooved rollers 34, 35 are provided for holding the ram rod and piston parallel to the frame of the rammer.

In the particular apparatus illustrated, the kiln is about 6 feet in diameter and the rammer has a 10 foot stroke which carries the scraper plate completely through the combustion chamber and into the kiln for a distance of about 5 feet. The ram rod is so directed that it just clears the dam and scrapes clean successive sections of the dam and the neighboring kiln wall as these rotate through an upper or "12 o'clock" position.

The ram rod should be provided with adequate power both to thrust the scraper plate into the kiln rapidly and to remove it rapidly, in order to break off accretions with ease and to avoid catching the furnace end of the ram rod in the charge as the kiln rotates. Such action may be imparted to the ram rod by compressed air supplied on both sides of the piston by conventional valves, not shown.

To consider the practice of the invention with the apparatus just described, a charge containing 13.2% zinc in oxidized state and 12.8% carbon as coal was fed through the kiln at the rate of 3.0 tons per hour, the tons of zinc burden per hour on the kiln being .4 ton. Air was supplied to the kiln at the rate of 2000 cubic feet per minute, of which 735 cubic feet per minute was supplied at a pressure of 25–30 inches of water by the blast. The charge was fed at a rate such that all but a small proportion of the zinc in the charge was evolved before the charge reached the vicinity of the air blast. The residue after blasting contained .90% zinc and 1.10% carbon.

In this operation, the mechanical barring apparatus was employed at intervals of about 15 minutes to keep the discharge end of the kiln free of accretions. The air for oxidizing the evolved zinc was preheated by passing into the kiln through the hot zone maintained in the neighborhood of the blast. The discharge end of the kiln was maintained at white heat by the oxidation of residual coal and of sponge iron in the charge, the sponge iron having been formed by reduction of iron derived from franklinite as the charge travelled through the kiln toward the blast zone.

For comparative purposes, a similar charge was treated in the kiln by conventional methods and without air blasting. An effort was made to maintain about the same proportion of zinc in the residue as was obtained in the practice of the invention. Under these conditions, it was found impossible to treat more than 2.22 tons per hour of a charge containing 12.2% zinc and 15.7% carbon, the zinc burden of the kiln in tons per hour being .27 ton. In order to keep the kiln hot, it was necessary to employ auxiliary fuel by means of an oil burner introduced into the chamber at the discharge end of the kiln, the auxiliary fuel thus supplied being equivalent to 460 B. t. u. per pound of dry charge. The residue resulting from this operation contained 1.28% zinc and 8.30% carbon. The total air input to the kiln was about 1570 cubic feet per minute.

Direct comparison of the two operations is made below:

|  | Without air blast | With air blast |
|---|---|---|
| Tons dry charge per hour | 2.22 | 3.0 |
| Tons of zinc burden per hour | .27 | .40 |
| Per cent zinc in dry charge | 12.2 | 13.2 |
| Per cent carbon in dry charge | 15.7 | 12.8 |
| Per cent zinc in residue | 1.28 | .90 |
| Per cent carbon in residue | 8.30 | 1.10 |
| Total air entering kiln including blast air, cu. ft./min | 1570 | 2000 |
| Blast air entering kiln, cu. ft./min | None | 735 |
| Auxiliary fuel used—B. t. u. per pound of dry charge | 460 | None |

From the foregoing it will be apparent that the practice of the invention permits operation of a Waelz kiln without auxiliary fuel (a substantial economic advantage) and an increase in capacity in terms of charge of about 35% and in terms of zinc burden of about 50%. The greater efficiency of a Waelz kiln when operated according to the invention is attributable (1) to the more efficient utilization of carbon in the charge; (2) to the recovery of the heat of oxidation of the metallic iron, which otherwise would pass out largely in the form of sponge iron; and (3) to the preheating of the air obtainable by virtue of the hot zone formed by the blast.

We claim:

1. In the recovery of volatile metal as oxide from a solid charge containing a carbonaceous reducing agent involving passing the charge through an elongated rotating kiln countercurrent to a stream of oxidizing gas and heating the charge during its passage so that the volatile metal is evolved and burned in the kiln with resultant production of oxide fume that is withdrawn from the charging end of the kiln while a hot solid residue is discharged from the discharge end of the kiln, the improvement which comprises evolving and burning all but a small proportion of the volatile metal before the residue reaches the discharge end of the kiln, and before said residue reaches the blast, thereafter directing against this residue just prior to discharge from the kiln a blast of oxidizing gas to oxidize constituents in the residue and produce a zone of intense heat, and introducing further oxidizing gas into the kiln through said zone.

2. In the recovery of volatile metal as oxide from a solid charge containing a carbonaceous reducing agent and a compound of a relatively non-volatile metal involving passing the charge through an elongated rotating kiln countercurrent to a stream of oxidizing gas and heating the charge during its passage so that the volatile metal is evolved and burned in the kiln with resultant production of oxide fume that is withdrawn from the charging end of the kiln while a hot solid residue is discharged from the discharge end of the kiln, the improvement which comprises evolving and burning all but a small proportion of the volatile metal before the residue reaches the discharge end of the kiln and before said residue reaches the blast and at the same time reducing said compound with the carbonaceous reducing agent to produce the non-volatile metal in reduced state in the residue, thereafter directing against this residue just prior to discharge from the kiln a blast of oxidizing gas to reoxidize the non-volatile metal in the residue and produce a zone of intense heat, and introducing further oxidizing gas into the kiln through said zone to maintain said stream.

3. In the recovery of volatile metal as oxide from a solid charge containing a carbonaceous reducing agent and a compound of a relatively non-volatile metal involving passing the charge through an elongated rotating kiln countercurrent to a stream of oxidizing gas and heating the charge during its passage so that the volatile metal is evolved and burned in the kiln with resultant production of oxide fume that is withdrawn from the charging end of the kiln while a hot solid residue is discharged from the discharge end of the kiln, the improvement which comprises evolving and burning all but a small proportion of the volatile metal before the residue reaches the discharge end of the kiln and before said residue reaches the blast and simultaneously reducing the non-volatile metal in the charge with the carbonaceous reducing agent to yield the non-volatile metal in reduced form in the residue, thereafter directing against this residue just prior to discharge from the kiln a blast of oxidizing gas to oxidize excess carbonaceous reducing agent and re-oxidize the non-volatile metal in the residue and produce a zone of intense heat, and introducing further oxidizing gas into the kiln through said zone to maintain said stream.

4. In the recovery of volatile metal as oxide from a solid charge containing a carbonaceous reducing agent involving passing the charge through an elongated rotating kiln countercurrent to a stream of oxidizing gas and heating the charge during its passage so that the volatile metal is evolved and burned in the kiln with resultant production of oxide fume that is withdrawn from the charging end of the kiln while a hot solid residue is discharged from the discharge end of the kiln, the improvement which comprises evolving and burning all but a small proportion of the volatile metal before the residue reaches the discharge end of the kiln and before said residue reaches the blast while leaving relatively non-volatile oxidizable constituents in the residue, thereafter directing against this residue just prior to discharge from the kiln a blast of auxiliary oxidizing gas to oxidize the constituents in the residue and produce a zone of intense heat, and preheating the stream of oxidizing gas by passing it into the kiln through said zone.

5. In the recovery of volatile metal as oxide from a solid charge containing a carbonaceous reducing agent and a compound of a relatively non-volatile metal involving passing the charge through an elongated rotating kiln countercurrent to a stream of oxidizing gas and heating the charge during its passage so that the volatile metal is evolved and burned in the kiln with resultant production of oxide fume that is withdrawn from the charging end of the kiln while a hot solid residue is discharged from the discharge end of the kiln, the improvement which comprises evolving and burning all but a small proportion of the volatile metal before the residue reaches the discharge end of the kiln and before said residue reaches the blast while reducing the compound of the non-volatile metal in situ, thereafter directing against this residue on a restricted area just prior to discharge from the kiln a blast of auxiliary oxidizing gas to oxidize excess carbonaceous reducing agent and the reduced volatile metal in the residue and produce a zone of intense heat, and preheating the stream of oxidizing gas by introducing it into the kiln through said zone.

6. In the recovery of volatile metal as oxide from a solid charge containing a carbonaceous reducing agent involving passing the charge through an elongated rotating kiln countercurrent to a stream of oxidizing gas and heating the charge during its passage so that the volatile metal is evolved and burned in the kiln with resultant production of oxide fume that is withdrawn from the charging end of the kiln while a hot solid residue is discharged from the discharge end of the kiln, the improvement which comprises evolving and burning all but a small proportion of the volatile metal before the residue reaches the blast and the discharge end of the kiln, damming the discharge end of the kiln to maintain a substantial body of residue just inside said end, directing against the residue just prior to discharge from the kiln a blast of auxiliary oxidizing gas to oxidize constituents in the residue and produce a zone of intense heat, and preheating the stream of oxidizing gas by introducing it into the kiln through said zone.

7. In the recovery of volatile metal as oxide from a solid charge containing a carbonaceous reducing agent involving passing the charge through an elongated rotating kiln countercurrent to a stream of oxidizing gas and heating the charge during its passage so that the volatile metal is evolved and burned in the kiln with resultant production of oxide fume that is withdrawn from the charging end of the kiln while a hot solid residue is discharged from the discharge end of the kiln, the improvement which comprises evolving and burning all but a small proportion of the volatile metal before the residue reaches a blast at the discharge end of the kiln, thereafter directing against this residue just prior to discharge from the kiln the blast of oxidizing gas to oxidize constituents in the residue and produce a zone of intense heat, barring the walls of the kiln in said zone above the main body of residue at frequent intervals, and introducing further oxidizing gas into the kiln through said zone to maintain the stream.

8. In the recovery of zinc as oxide from a solid charge containing a carbonaceous reducing agent involving passing the charge through an elongated rotating kiln countercurrent to a stream of oxidizing gas and heating the charge during its passage so that the zinc is evolved and burned in the kiln with resultant production of zinc oxide fume that is withdrawn from the charging end of the kiln while a hot solid residue is discharged from the discharge end of the kiln, the improvement which comprises evolving and burning all but a small proportion of the zinc before the residue reaches a blast of oxidizing gas at the discharge end of the kiln while leaving substantial proportions of oxidizable material other than zinc in the residue, thereafter directing against this residue just prior to discharge from the kiln a blast of oxidizing gas to oxidize said material in the residue and produce a zone of intense heat, and introducing further oxidizing gas into the kiln through said zone to maintain the stream.

9. In the recovery of zinc as oxide from a solid charge containing an iron compound and a carbonaceous reducing agent involving passing the charge through an elongated rotating kiln countercurrent to a stream of oxidizing gas and heating the charge during its passage so that the zinc is evolved and burned in the kiln with resultant production of zinc oxide fume that is withdrawn from the charging end of the kiln while a hot solid residue is discharged from the discharge end of the kiln, the improvement which comprises evolving and burning all but a small proportion of the zinc before the residue reaches a blast of oxidizing gas at the discharge end of the kiln while reducing the iron compound to metallic iron, thereafter directing against this residue just prior to discharge from the kiln the blast of oxidizing gas to oxidize the iron in the residue and produce a zone of intense heat and maintaining the stream by introducing further oxidizing gas into the kiln through said zone.

10. In the recovery of zinc as oxide from a solid charge containing a carbonaceous reducing agent involving passing the charge through an elongated rotating kiln countercurrent to a stream of oxidizing gas and heating the charge during its passage so that the zinc is evolved and burned in the kiln with resultant production of oxide fume that is withdrawn from the charging end of the kiln while a hot solid residue is discharged from the discharge end of the kiln, the improvement which comprises evolving and burning all but a small proportion of the zinc before the residue reaches a blast of oxidizing gas at the discharge end of the kiln, thereafter directing against this residue just prior to discharge from the kiln the blast of oxidizing gas to oxidize excess carbonaceous reducing agent in the residue and produce a zone of intense heat, and maintaining the stream by introducing further oxidizing gas into the kiln through said zone.

11. In the recovery of zinc as oxide from a solid charge containing a carbonaceous reducing agent involving passing the charge through an elongated rotating kiln countercurrent to a stream of oxidizing gas and heating the charge during its passage so that the zinc is evolved and burned in the kiln with resultant production of zinc oxide fume that is withdrawn from the charging end of the kiln while a hot solid residue is discharged from the discharge end of the kiln, the improvement which comprises evolving and burning all but a small proportion of the zinc before the residue reaches a blast of oxidizing gas at the discharge end of the kiln, thereafter directing downwardly against a restricted area on the surface of this residue just prior to discharge from the kiln the blast of oxidizing gas to oxidize at least one of the materials consisting of excess carbonaceous reducing agent and sponge iron in the residue and produce a zone of intense heat, and introducing further oxidizing gas into the kiln through said zone to maintain the stream.

12. In the recovery of zinc as oxide from a solid charge containing a carbonaceous reducing agent involving passing the charge through an elongated rotating kiln countercurrent to a stream of oxidizing gas and heating the charge during its passage so that the zinc is evolved and burned in the kiln with resultant production of zinc oxide fume that is withdrawn from the charging end of the kiln while a hot solid residue is discharged from the discharge end of the kiln, the improvement which comprises evolving and burning all but a small proportion of the zinc before the residue reaches a blast of oxidizing gas at the discharge end of the kiln, thereafter directing against this residue just prior to discharge from the kiln the blast of oxidizing gas to oxidize excess carbonaceous reducing agent and non-volatile metal in the residue and produce a zone of intense heat, barring residue from the walls of the kiln in said zone at frequent intervals during the discharge of the residue, and preheating the stream by introducing further oxidizing gas into the kiln through said zone.

13. In the recovery of zinc as oxide from a solid charge containing a carbonaceous reducing agent involving passing the charge through an elongated rotating kiln countercurrent to a stream of oxidizing gas and heating the charge during its passage so that the zinc is evolved and burned in the kiln with resultant production of zinc oxide fume that is withdrawn from the charging end of the kiln while a hot solid residue is discharged from the discharge end of the kiln, the improvement which comprises evolving and burning all but a small proportion of the zinc before the residue reaches a blast of oxidizing gas at the discharge end of the kiln, damming the discharge end of the kiln to maintain therein a substantial body of residue from which all but a small proportion of the zinc has been removed, directing against said body just prior to discharge from the kiln the blast of oxidizing gas to oxidize constituents other than zinc in the residue and produce a zone of intense heat, and preheating the stream by introducing further oxidizing gas into the kiln through said zone.

ERNEST W. STECKEL.
GEORGE T. MAHLER.